March 25, 1941.  J. J. TYNE  2,235,908
THREADING MACHINE
Filed Sept. 22, 1938  2 Sheets-Sheet 1
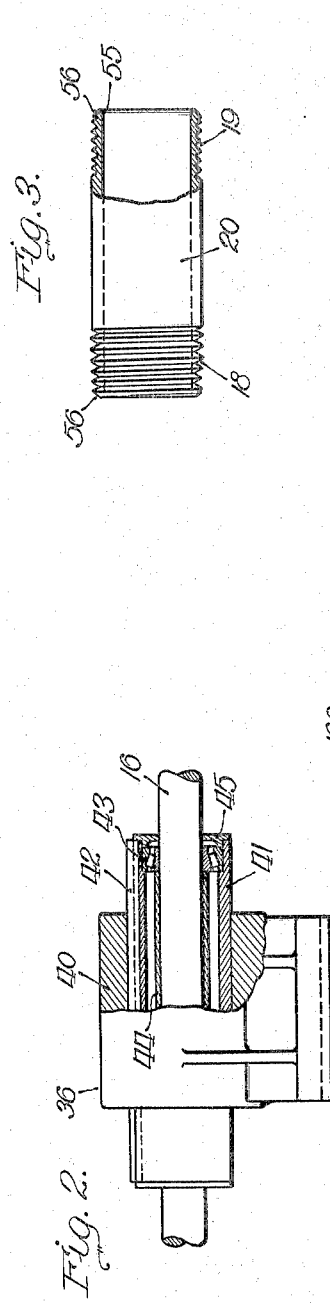
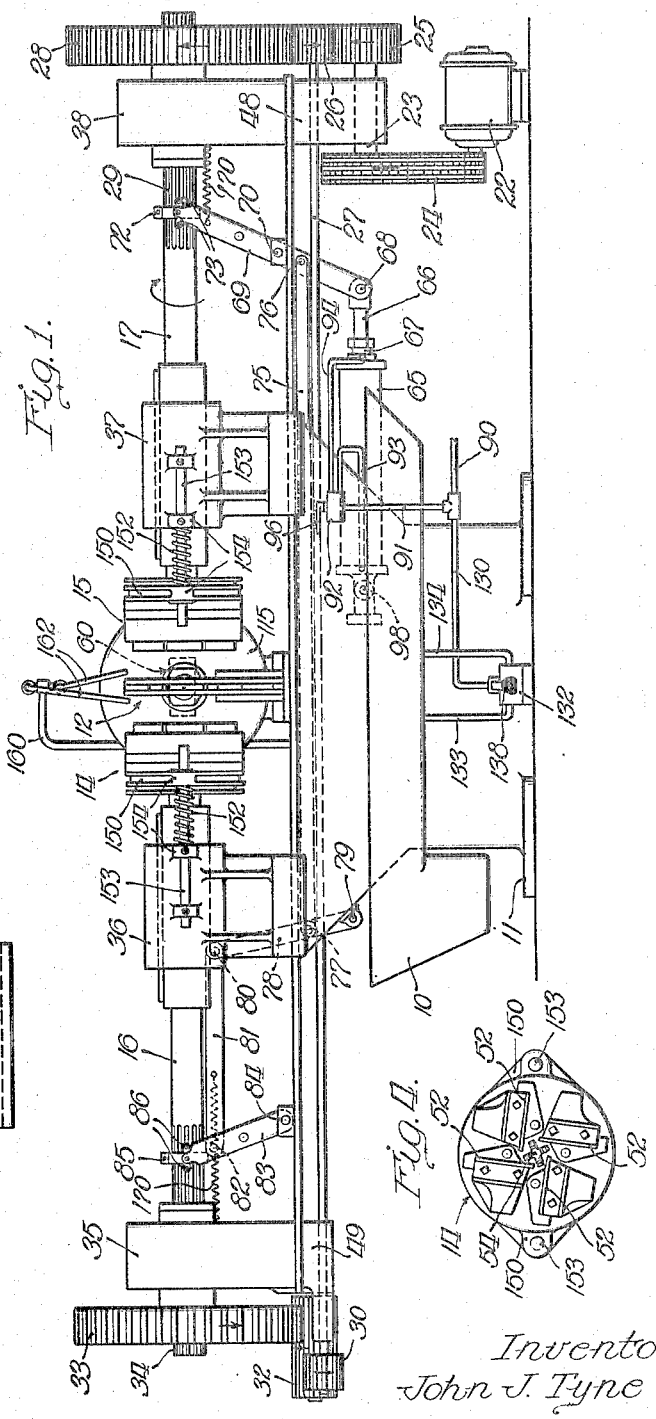
Inventor:
John J. Tyne
By: Brown, Jackson, Boettcher & Dienner
Attys.

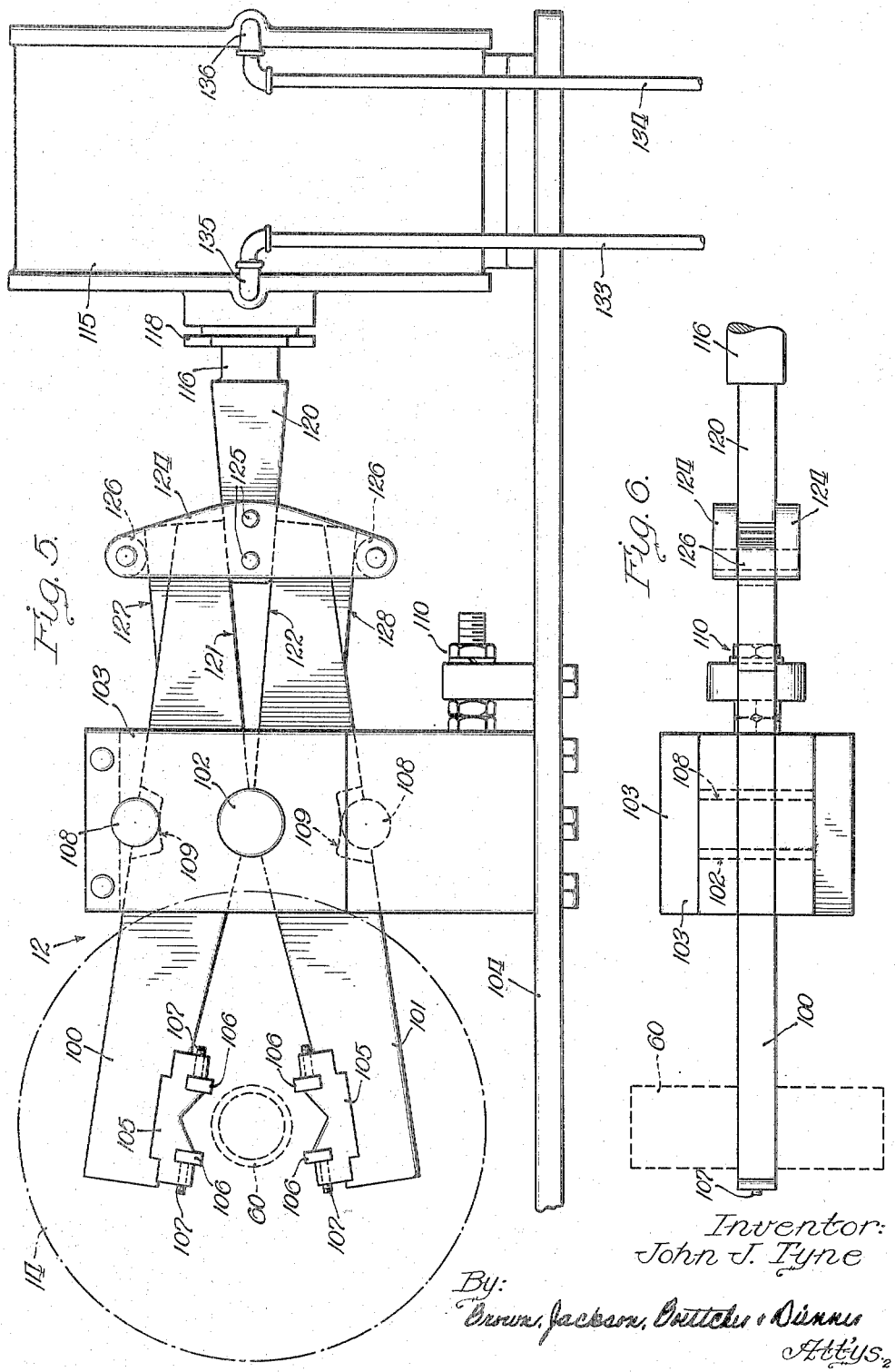

Patented Mar. 25, 1941

2,235,908

UNITED STATES PATENT OFFICE 2,235,908

THREADING MACHINE

John J. Tyne, Oak Park, Ill., assignor to Tyne Co., Chicago, Ill., a corporation of Illinois Application September 22, 1938, Serial No. 231,214

3 Claims. (Cl. 10—92)

This invention relates to threading machine, and particularly a pipe and nipple threading machine.

While the particular machine which I shall describe hereinafter in connection with the drawings is a double end machine adapted for threading opposite ends of a pipe nipple, tube, or other member to be threaded, it is to be understood that the invention may be embodied in a single end machine, or employed in all similar work within the scope of the appended claims.

According to my invention, I provide an improved form of work-holding vise means which is closed to hold the member to be threaded in threading position between and in axial alignment with the threading die heads of the machine and opened to release the work by fluid pressure means, and particularly pneumatically.

I also provide for moving the threading die heads axially into and out of threading position relative to the opposite ends of the member to be threaded by fluid pressure, and particularly by pneumatically actuated means.

The improved form of work-holding vise means of the present invention comprises two jaws which are closed upon the work to hold same in position and opened by fluid pressure, and particularly by pneumatically actuated means, and both jaws move to equalize their application to the work. The vise means is of short length longitudinally of the machine to permit handling of short pieces to be threaded.

The chief advantages of my invention consist in reducing the amount of labor to be performed by the operator and the skill required to operate the machine and in increasing the speed of operation and, thereby, the output of the machine. Where, for example, the threading die heads are moved into and out of threading position manually and the work-holding means opened and closed manually as herefore in the art, skilled labor is required and the human element results in reduced output of the machine. The operating mechanism of the present invention is characterized by its ease, convenience, and speed of operation, and the entire machine is thereby made capable of maintaining a greater and more uniform speed of operation with a resulting increased output. Less work is imposed upon the operator, and the machine is adapted for use by unskilled labor.

The increased production over hand-operated machines is marked, and the machine of the present invention is adapted for threading pipes, nipples, tubes and other members up to diameters at least 50% larger than those that can be handled with the prior art machines.

The machine is operable expeditiously, and is of simple construction, particularly with respect to the improved work-holding vise means and with respect to the fluid pressures or pneumatic means for closing and opening the work-holding vise and for moving the threading die heads into and out of threading position.

Numerous advantages and adaptations of the invention will be apparent from the following detailed description, taken in connection with the accompanying drawings in which:

Figure 1 is a front elevational view of a pipe and nipple threading machine embodying the present invention;

Figure 2 is a detail partially in elevation and partially in section of one of the bearing supports for one of the splined shafts;

Figure 3 is a view partially in elevation and partially in section of a tubular member threaded and reamed with the machine of the present invention;

Figure 4 is an end or face view of one of the threading die heads, showing the reamer in position therein;

Figure 5 is a more or less diagrammatic side elevational view showing the vise or work-holding means for holding the member to be threaded in position between the threading die heads and in axial alignment therewith, and the fluid pressure actuating means therefor; and Figure 6 is a fragmentary top plan view of the vise or work-holding means shown in Figure 5.

Referring now in detail to the drawings, the embodiment of the invention selected for illustration comprises a main frame consisting of a base or bed section 10 having suitable supporting means at 11. The threading die heads 14 and 15 are disposed in axial alignment, and vise or work-holding means, designated in its entirety at 12, is adapted for holding the member to be threaded between the threading die heads 14 and 15 and in axial alignment therewith.

The threading die heads 14 and 15 are rotated by splined shafts 16 and 17, preferably in opposite directions, to form the threads 18 and 19 on opposite ends of the tubular member 20 (Figure 3) preferably in the same direction, i. e., either right hand or left hand. This may, of course, vary. Any suitable driving means, such as a belt drive or a motor drive, may be employed for driving the shafts 16 and 17. In the illustrated embodiment of the invention I have shown a driving motor 22 driving a shaft 23 through a driving chain 24. The shaft 23 has a gear 25 thereon which meshes with a gear 26 on a shaft 27. The gear 26 meshes with and drives an axially fixed gear 28 and serves as a reduction gear. The gear 28 is splined upon the splined end 29 of the shaft 17 to turn the shaft 17 therewith and, at the same time, permit axial shifting movement of the shaft 17 relative to the gear 28.

The shaft 27 extends longitudinally of the machine and, at its opposite end, has a gear 30 thereon. This gear 30 meshes with an idler gear 32 which, in turn, meshes with the gear 33 to rotate the same opposite the direction of rotation of the gear 28. The gear 33 is splined upon the splined end 34 of the shaft 16 to turn the shaft 16 therewith opposite the direction of rotation of the shaft 17 and, at the same time, to permit axial shifting movement of the shaft 16 relative to the axially fixed gear 33.

Each splined shaft 16 and 17 is supported for rotation and axial sliding movement in a pair of bearing supports 35, 36 and 37, 38, respectively. These bearing supports are mounted in fixed position upon the main frame or bed 10 of the machine. As shown in Figure 2, each bearing support 36 and 37 comprises the main bearing supporting member 40 in which a bearing sleeve 41 is held against rotation, for example by a suitable key 42. "Timken" or other suitable roller bearings 43 are mounted in the bearing sleeves 41, and bearing separator sleeves and bearing retainer caps are provided as shown at 44 and 45, respectively. The bearing supports 36 and 37 may, of course, be of any other suitable or preferred form, and the bearing supports 35 and 38 are suitably formed to support the splined shafts 16 and 17 for rotation and axial movement therein.

A bearing support at 48 supports the shaft 23 and the adjacent end of the shaft 27. The opposite end of the shaft 27 may be supported in a suitable bearing support 49.

The threading die heads 14 and 15 are of the "Landis" type, well known in the art. It is to be understood, however, that the present invention is not limited to embodiment in the particular type of machine shown and described, nor is it limited to use with the particular type of threading die heads above mentioned.

Suffice it, for purposes of the present description, to state that the die proper of each threading die head 14 and 15 consists of four chasers 52 (Figure 4), which are tangentially inclined to the work to agree with the pitch of the thread. A reamer 54 is mounted in each of the threading heads 14 and 15. These reamers 54 are preferably of the type disclosed and claimed in my copending application Serial No. 231,213, filed September 22, 1938, although they may be of other form within the scope of the present invention.

The reamers 54 have blades provided with cutting edges for removing the burrs from the inside of the opposite ends of the tubular member 20 at 55 (Figure 3), and cutting edges for chamfering the outside of the opposite ends of the member 20, as indicated at 56. Also, as set forth in my copending application, the reamers 54 have shoulders which are adapted to be engaged by the ends of the pipe or tube when the lengths of thread for which the reamers are adjusted is formed and the ends of the pipe have been reamed and chamfered as above set forth. The engagement of the ends of the pipe or tube with these shoulders actuates tripping mechanism—for example, of the character employed in the "Landis" or any other type threading heads—automatically to trip the threading heads and thereby open the threading jaws, whereupon the vise or holding means is released to release the work, and it drops, for example, into a pan or the like placed beneath the same.

With the work supported in position between the threading heads 14 and 15 and in axial alignment therewith, as shown in dotted lines at 60 in Figure 1, the threading heads are moved axially toward each other into threading position relative to the opposite ends of the work by shifting the shafts 16 and 17 axially toward each other, i. e., the shaft 16 axially to the right and the shaft 17 axially to the left as viewed in Figure 1. Heretofore, this shifting of the threading heads to threading position or into threading engagement with the work has been accomplished manually by rack and pinion means and the like, which has made it necessary to use skilled operators, has reduced the speed of operation, and thereby the output of the machine, and has also restricted the size of work that could be handled.

The present invention shifts the splined shafts 16 and 17 axially and, thereby, the threading die heads 14 and 15 axially into and out of threading engagement with the ends of the work 60 by fluid pressure means, and particularly by pneumatically actuated means.

The particular pneumatic operating means shown in the drawings comprises an air cylinder 65 which may be mounted, for example, on the bed of the machine. It has a piston operable therein, and the piston (not shown) is connected to a piston rod 66 which extends out through airtight means 67 at one end of the cylinder 65, and is pivoted at 68 to an actuating lever 69. The lever 69 is pivoted intermediate its ends at 70, for example, upon the bed or frame 10. A collar 72, fixed upon the splined shaft 17, fits between rollers 73, 73 on the upper end of the lever 69, so that when the lever is swung counterclockwise (Figure 1) about its pivot 70, the engagement of the collar 72 between the rollers 73, 73 shifts the splined shaft 17 and, thereby, the threading die head 15 axially to the left. Swinging movement of the lever 69 in the opposite direction shifts the shaft 17 and the threading head 15 axially to the right (Figure 1).

A longitudinally extending connecting link 75, pivoted at 76 to the lever 69 below the pivot 70, is pivoted at its opposite end at 77 to a lever 78, which lever 78 is pivoted at 79, for example, to the frame of the machine beneath the pivotal connection at 77 with the link 75. The upper end of the lever 78 is pivoted at 80 to a link 81 which, in turn, is pivoted at 82 to a lever 83. The lever 83 is pivoted at 84, for example, to the frame of the machine, and a collar 85, similar to the collar 72, fixed upon the splined shaft 16, fits between rollers 86, 86 on the upper end of the lever 83 so that shifting of the threading head 15 to the left and into threading engagement with one end of the work 60 is accompanied by a shifting of the threading head 14 to the right and into threading engagement with the opposite end of the work.

Air pressure is supplied from a suitable source of air pressure supply (not shown) by way of an air pressure pipe 90, which is connected by an air line 91 to a suitable manually controlled valve 92, and through the valve 92 and suitable air connections 93 and 94 to the opposite ends of the cylinder 65. The valve 92 is provided with a manually controlled handle 96 by means of which the operator may apply air pressure selectively to either of the opposite ends of the cylinder 65 to actuate the threading heads 14 and 15 into and out of threading position, as desired. The piston (not shown) within the cylinder 65 is pivoted at 98 to allow for the swinging movement of the lever 69, but this may be accomplished in any other suitable or preferred manner, as for example by means of a slot and pin connection at 68.

The vise or work-holding means 12 is in the form of a clamping device comprising two jaws 100 and 101 (Figure 5) fulcrumed or pivoted at 102 in a suitable jaw support or retainer 103 adjustably mounted, for example, upon the frame part 104 of the machine. The inner work gripping surfaces of the jaws 100 and 101 have replaceable blocks 105 therein, and these blocks 105 have inserts 106 which are preferably formed of case-hardened steel or the like, for gripping engagement with the work without undue wear. The inserts 106 are secured in place in the blocks 105 by screws 107, and may, if desired, be arranged for adjustment toward and away from each other by these screws properly to grip tubes of different diameters.

Of course instead of adjusting the inserts 106 as above mentioned, these inserts may be merely replaceably secured in place by the screws 107 and different spacing of the inserts provided for tubular work of different diameters by replacing the blocks 105 with other blocks having the inserts 106 differently spaced. The blocks 105 may be replaceably secured to the jaws 100 and 101 in any suitable or preferred manner, as for example, by pressed fit as shown.

Retainer pins 108, extending through the space between the opposite sides of the jaw support 103 and engaging in notches 109 in the jaws 100 and 101, permit swinging movement of the jaws to open and closed positions, and, at the same time, retain the jaws in fulcrumed or pivoted position in the support 103. Adjusting means at 110 (Figure 5) is operable to adjust the jaw support 103, and thereby the jaws 100 and 101, inwardly and outwardly so that they will hold the work, indicated in dotted lines at 60 (Figures 5 and 6), in axial alignment with the threading die heads 14 and 15.

The work-holding jaws 100 and 101 are opened and closed by fluid pressure, and particularly by pneumatically actuated means. The particular pneumatic actuating means for opening and closing the jaws, shown in the drawings, comprises an air chamber 115 having a piston (not shown) operable therein. The piston is connected to a piston rod 116 which extends out through airtight means 118 and has, at its outer end, a wedge or tapered plunger 120. The wedge or plunger 120 operates between the inner surfaces 121 and 122 (Figure 5) of the jaws 100 and 101. A yoke member 124, secured to the wedge 120 at 125, carries rollers 126 which cooperate with the surfaces 127 and 128 of the jaws 100 and 101.

An air supply connection 130 (Figure 1) supplies air under pressure from the air supply line 90 to a valve 132, and through this valve 132 and air connections 133 and 134 selectively to opposite ends of the air chamber 115 at 135 and 136. The valve 132 is manually controlled as by means of a foot pedal 138 (Figure 1), by means of which the operator may apply air pressure selectively to either end of the air chamber 115 for moving the piston in one direction to close the jaws 100 and 101 upon the work or, in the other direction, to open the jaws from the work.

When, for example, the valve 132 is operated to apply air pressure to the chamber 115 at 136, the piston with the chamber 115 is moved to the left (Figure 5), forcing the wedge 120 to the left, and this wedge, by its wedging cooperation with the jaws, forces the work gripping inserts 106 into firm gripping engagement with the work to hold the same in position between the threading die heads 14 and 15 and in axial alignment therewith. On the other hand, when the valve 132 is operated to apply air pressure to the chamber 115 at 135, the piston is moved in the opposite direction, withdrawing the wedge 120 from between the jaws, and the rollers 126, by cooperation with the surfaces 127 and 128 of the jaws, swing the same to open position to release the work. The movement of both jaws equalizes their application to the work, and this equalized application of the work-holding means is an important aspect of the present invention.

In operation of the machine, the jaw support 103 is adjusted to position the jaws so that they will grip and hold the work in axial alignment with the threading heads 14 and 15. With the jaw support thus positioned, the operator merely places the work between the jaws, and, by manipulating the valve 132 with his foot, applies air pressure to close the jaws into equalized holding engagement with the work. Then by the simple expedient of operating the valve 96, the threading die heads 14 and 15 are closed into threading engagement with the opposite ends of the work. Upon completion of the desired lengths of threads and reaming and chamfering the opposite ends of the work, as shown in Figure 3, the engagement of the ends of the work with shoulders on the reamers trips the threading jaws of the threading heads to open position, whereupon the valve 132 is operated to release the work, and, by operation of the valve 96, the threading heads are separated to receive another piece of work. Springs 170 are preferably connected between the lever 69 and the stationary portion of the adjacent bearing 38 and between the link 81 and the stationary portion of the adjacent bearing 35, as shown in Figure 1.

As already pointed out, the die heads are opened and closed automatically, and the automatic mechanism is controlled by means of a trip by which adjustment for any desired length of thread may be obtained. The yoke rings 150 (Figure 1) are similar to the yoke rings of the "Landis" type die heads. These rings 150 are separated axially from the heads 14 and 15 in the tripping operation, and are reset to close the threading jaws by springs 152. The springs 152 are coiled about pins 153 and confined between abutments 154 on the rings 150 and bearing supports 36 and 37.

A pipe line 160, for oil or other suitable cooling liquid (Figure 1), has outlets 162 for delivering the oil or other liquid to cool the cutting edges of the die heads in the threading operation.

It is to be understood that the particular operating connections for operating the work-holding means and the threading heads from the fluid pressure or pneumatic actuating means are shown more or less diagrammatically in the drawings and may be modified as desired within the scope of the present invention. The work-holding jaws 100 and 101 are of short length longitudinally of the machine, thereby permitting handling of short pieces to be threaded. The operation of the machine by fluid pressure or pneumatic operation, as herein described, relieves the operator of any fatigue, particularly after he has been at work for a period of time. The machine is operated easily, conveniently, and at greater speed. The output of the machine is increased, and unskilled labor may be employed to operate the same.

I do not intend to be limited to the precise details shown or described.

I claim:

1. In a threading machine of the class described, in combination, a main frame, bearing supports mounted in fixed position upon said frame, a pair of coaxial shafts supported for rotation and axial sliding movement in said bearing supports, a pair of threading die heads, one at the inner end of each of said shafts and adapted to be rotated and moved axially by said shafts, gears splined on said shafts outwardly of said bearing supports, a driving shaft extending longitudinally of the machine and having a gear at one end meshing with one of said first gears, a gear on the opposite end of said shaft, an idler gear meshing with said last gear and with the other of said first mentioned gears, a lever pivoted on said frame and coacting with one of said first mentioned shafts for shifting same axially by swinging movement of said lever, a second lever pivoted on said frame and coacting with the other of said first-mentioned shafts for shifting same axially by swinging movement of said lever, linkage means connecting said levers for swinging one of said levers by the swinging movement of the other lever and in a direction opposite the direction of swinging movement of said other lever, means for supporting a member to be threaded between said threading die heads and coaxial therewith, a fluid pressure cylinder, a piston operable in said cylinder and connected to one of said levers for shifting the threading die heads in opposite directions to engage the opposite ends of the member to be threaded and for retracting said threading die heads from the opposite ends of said member, a fluid pressure supply line, and valve means operable to supply fluid pressure selectively to the opposite ends of said fluid pressure cylinder.

2. In a threading machine of the class described, in combination, a main frame, two pairs of spaced bearing supports mounted in fixed position on said frame, a pair of coaxial shafts, one supported for rotation and axial sliding movement in each pair of bearing supports, a pair of threading die heads, one at the inner end of each of said shafts and adapted to be rotated and moved axially by said shafts, gears splined on said shafts outwardly of said bearing supports, a driving shaft extending longitudinally of the machine and having a gear at one end meshing with one of said first gears, a gear on the opposite end of said shaft, an idler gear meshing with said last gear and with the other of said first mentioned gears, a lever pivoted on said frame and coacting with one of said first shafts between the pair of bearing supports therefor for shifting said shaft axially by swinging movement of said lever, a second lever pivoted on said frame and coacting with the other of said first mentioned shafts between the bearing supports for said other shaft for shifting said shaft axially by swinging movement of said lever, linkage means connecting said levers for swinging one of said levers by the swinging movement of the other lever and in a direction opposite the direction of swinging movement of said other lever, means for supporting a member to be threaded between said threading die heads and coaxial therewith, a fluid pressure cylinder, a piston operable in said cylinder and connected beyond one end of the cylinder to one of said levers for shifting the threading die heads in opposite directions to engage the opposite ends of the member to be threaded and for retracting said threading die heads from the opposite ends of said member, a fluid pressure supply line, valve means operable to supply fluid pressure selectively to the opposite ends of said fluid pressure cylinder, and means pivotally mounting the other end of said piston on said frame to allow for swinging movement of the lever connected to said piston.

3. In a threading machine of the class described, in combination, a main frame, bearing supports mounted in fixed position upon said frame, bearing sleeves extending through openings in said bearing supports and splined against rotation therein, spaced bearings supported in said bearing sleeves, bearing separator sleeves between said bearings, bearing retainer caps at the outer ends of said bearing sleeves, a pair of coaxial shafts supported for rotation and axial sliding movement in said bearing supports, a pair of threading die heads, one at the inner end of each of said shafts and adapted to be rotated and moved axially by said shafts, gears splined on said shafts outwardly of said bearing supports, a driving shaft extending longitudinally of the machine and having gear connection with said first shafts through said last mentioned gears for rotating said first shafts in opposite directions, a lever pivoted on said frame and coacting with one of said first mentioned shafts for shifting same axially by swinging movement of said lever, a second lever pivoted on said frame and coacting with the other of said first mentioned shafts for shifting same axially by swinging movement of said lever, linkage means connecting said levers for swinging one of said levers by the swinging movement of the other lever and in a direction opposite the direction of swinging movement of said other lever, means for supporting a member to be threaded between said threading die heads and coaxial therewith, a fluid pressure cylinder, a piston operable in said cylinder and connected to one of said levers for shifting the threading die heads in opposite directions to engage the opposite ends of the member to be threaded and for retracting said threading die heads from the opposite ends of said member, a fluid pressure supply line, and valve means operable to supply fluid pressure selectively to the opposite ends of said fluid pressure cylinder.

JOHN J. TYNE.